United States Patent
Tuchschmid et al.

(10) Patent No.: US 9,330,502 B2
(45) Date of Patent: May 3, 2016

(54) MIXED REALITY SIMULATION METHODS AND SYSTEMS

(71) Applicants: VIRTAMED AG, Zurich (CH); EIDGENOESSISCHE TECHNISCHE HOCHSCHULE ZURICH (ETH ZURICH), Zurich (CH)

(72) Inventors: Stefan Tuchschmid, Zurich (CH); Jonas Spillmann, Zurich (CH); Matthias Harders, Sheffield (GB)

(73) Assignees: EIDGENOESSISCHE TECHNISCHE HOCHSCHULE ZURICH (ETH ZURICH), Zurich (CH); VIRTAMED AG, Zurich (CH)

( * ) Notice: Subject to any disclaimer, the term of this patent is extended or adjusted under 35 U.S.C. 154(b) by 241 days.

(21) Appl. No.: 14/024,414

(22) Filed: Sep. 11, 2013

(65) Prior Publication Data

US 2014/0071165 A1  Mar. 13, 2014

Related U.S. Application Data

(60) Provisional application No. 61/700,222, filed on Sep. 12, 2012.

(51) Int. Cl.
    *G09G 5/00*     (2006.01)
    *G06T 19/00*    (2011.01)
    *G09B 23/30*    (2006.01)

(52) U.S. Cl.
    CPC ............. *G06T 19/006* (2013.01); *G09B 23/30* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 6,803,928 B2* | 10/2004 | Bimber et al. | ............... | 715/757 |
| 6,842,175 B1* | 1/2005 | Schmalstieg et al. | ......... | 345/427 |
| 7,225,404 B1* | 5/2007 | Zilles et al. | ................... | 715/701 |
| 7,817,167 B2* | 10/2010 | Suzuki et al. | ................. | 345/633 |
| 8,010,180 B2* | 8/2011 | Quaid et al. | ................. | 600/424 |
| 8,830,224 B2* | 9/2014 | Zhao et al. | .................... | 345/419 |
| 2003/0085866 A1* | 5/2003 | Bimber et al. | ............... | 345/156 |
| 2003/0227470 A1* | 12/2003 | Genc et al. | .................... | 345/633 |
| 2004/0113887 A1 | 6/2004 | Pair et al. | | |

(Continued)

FOREIGN PATENT DOCUMENTS

WO    WO 2012/106706    8/2012

OTHER PUBLICATIONS

Jay D. Mabrey et al., "Virtual Reality in Orthopaedics: Is It a Reality?", Clinical Orthopaedics and Related Research, vol. 468, Issue 10, pp. 2586-2591, Oct. 2010.

(Continued)

*Primary Examiner* — M Good Johnson
(74) *Attorney, Agent, or Firm* — DLA Piper LLP US

(57) ABSTRACT

Mixed reality simulation in general, and more specifically to mixed reality simulation devices and systems for training purposes, for example in the medical field, may be provided. For example, a mixed reality simulation method for rendering on a display a mixed reality scenario of a virtual environment adapted to a physical environment, may comprise acquiring, with a sensor, a position of a physical environment object; identifying a mismatch between a physical environment surface and a virtual environment surface, the mismatch depending on the physical environment object position and a mixed reality scenario parameter; and computing a mapping displacement for a virtual environment surface based on the identified mismatch.

35 Claims, 10 Drawing Sheets

(56) References Cited

U.S. PATENT DOCUMENTS

| | | | |
|---|---|---|---|
| 2005/0174361 A1* | 8/2005 | Kobayashi et al. | 345/633 |
| 2009/0088634 A1* | 4/2009 | Zhao et al. | 600/427 |
| 2010/0086905 A1 | 4/2010 | Illana Alejandro et al. | |
| 2010/0248200 A1 | 9/2010 | Ladak et al. | |
| 2012/0280988 A1* | 11/2012 | Lampotang et al. | 345/419 |
| 2013/0187930 A1* | 7/2013 | Millman | 345/473 |
| 2013/0187943 A1* | 7/2013 | Bohn et al. | 345/619 |
| 2013/0189663 A1 | 7/2013 | Tuchschmid et al. | |
| 2013/0323700 A1 | 12/2013 | Samosky et al. | |

OTHER PUBLICATIONS

Louise Moody et al., "The Feasibility of a Mixed Reality Surgical Training Environment", Virtual Reality, vol. 12, Issue 2, pp. 77-86, May 2008.

Rolf Ziegler et al., "Virtual reality Arthroscopy Training Simulator", Computers in Biology and Medicine, vol. 25, Issue 2, pp. 193-203, Mar. 1995.

A.L. Fuhrmann et al., "Comprehensive Calibration and Registration Procedures for Virtual Reality", In Proc. Eurographics Workshop on Virtual Environments 2001, pp. 219-228 (2001).

Luv Kohli, "Redirected Touching: Warping Space to Remap Passive Haptics", IEEE Symposium on 3D User Interfaces 2010, pp. 129-130, Mar. 20-21, 2010.

Jonas Spillmann et al., "Adaptive Space Warping to Enhance Passive Haptics in an Arthroscopy Surgical Simulator", IEE Transactions on Visualization and Compuater Graphics. vol. 19, No. 4, pp. 626-633, Apr. 2013.

Luv Kohli, "Redirected Touching", PhD Disseration, University of North Carolina (118 pages) (2013).

International Search Report issued in International Application No. PCT/IB2013/058460 dated Mar. 3, 2014.

* cited by examiner

MIXED REALITY SIMULATION METHODS AND SYSTEMS

CROSS-REFERENCE TO RELATED APPLICATIONS

This application claims the benefit of U.S. Provisional Patent Application Ser. No. 61/700,222, filed Sep. 12, 2012, naming Stefan Tuchschmid, Jonas Spillmann, Matthias Harders, entitled "Mixed reality simulator, method and system with passive haptic feedback", which is herein incorporated by reference in its entirety for all purposes.

FIELD OF THE INVENTION

Systems and methods described herein relate to mixed reality simulation in general, and more specifically to mixed reality simulation devices and systems for training purposes, for example in the medical field.

BACKGROUND OF THE INVENTION

In conventional virtual reality applications, visual simulation is primarily used to provide the end user with the visual illusion of interacting with the virtual environment. In mixed reality scenarios where the user jointly interacts with real objects in the physical environment (real environment) and related virtual environments, the sense of touch significantly eases navigation inside the virtual environment (VE), as users cannot pass through apparent solid surfaces, and thus mixed reality improves both the level of immersion and the skill acquisition. Often the physical contact is mimicked with an active haptic feedback device, such as two haptic devices arranged with a mobile member in the arthroscopy simulator described in US patent application publication 2010/0086905. That simulator includes a human anatomy model of a joint or organ in real size and a simulated medical instrument that imitates the real medical procedure instrument; the model is further adapted with sensors and mobile members for guiding, tracking, and controlling the medical instrument operation within the anatomy model. However, active haptic feedback is expensive from both a commercial and a computational point-of-view, in particular if stiff contact is being simulated. The degree of possible motion of the tools due to the mechanical configuration of the device is limited; they also suffer from various mechanical limitations, such as friction and inertia, and the maximum available amount of forces and torques is often not sufficient. In addition, today's devices are quite large and cannot be integrated easily into the simulator hardware. When different training scenarios have to be supported, for instance in a multipurpose training room, a different hardware setup is required for each different training model. Last but not least, from an operational point of view, active haptic feedback systems require specific setup and calibration prior to being operated; and in practice, the setup is not stable over time, thus requiring regular maintenance to avoid inducing training errors.

Passive haptic solutions, also known as tactile augmentation or mixed reality, provide a cost-effective alternative to active haptic feedback. The passive haptic technique involves the addition of inert real physical objects into the virtual environment simulator, resulting in a compelling tactile sensation. Compared to active haptic feedback, passive haptic results in a very realistic tactile sensation, in particular in combination with a rigid environment. However, the modifications of the virtual environment require modifications of the physical counterparts, as the mapping between the virtual environment and the associated physical objects is usually one-to-one to avoid a mismatch between the visual and tactile cues. This one-to-one mapping to the underlying physical environment makes the virtual environment inflexible. In the context of passive haptic surgical simulators, this may hinder simulating different virtual patients within the simulator or changing the training scenario dynamically.

This limitation will be better understood with reference to FIG. 1. FIG. 1 represents two different mixed reality scenarios B and C simulated from the real-world A interaction of a user physical manipulator 100a ($H_p$) with a physical object 110a ($E_p$) in the real environment A. The user physical manipulator 100a ($H_p$) may be represented by a manipulator avatar 100b, 100c ($H_v$) while the physical object 110a ($E_p$) may be represented by a physical object avatar 110b, 110c ($E_v$) in the virtual environment according to two different scenarios B and C. In scenario B the physical object avatar 110b ($E_v$) is larger than the real object 110a while the manipulator avatar 100b ($H_v$) has the same size has the original one 100a, so the default user interaction results in a collision and penetration of the manipulator avatar 100b with the object avatar 110b at discrepant contact interaction point 120b in the virtual environment B. The collision is seen when point 120b on the tip of the manipulator avatar touches the object avatar 110b ($E_v$) on the screen before it is experienced with the hand. Thus, no haptic stimuli are received at this point, which disturbs the user because of the resulting asynchronous visual and haptic stimuli perception. Conversely, in scenario C the physical object avatar 110c ($E_v$) is smaller than the real object 110a, so the end user does not see the manipulator avatar 100c ($H_v$) colliding with the object avatar 110c at discrepant contact interaction point 120c in the virtual environment C, while the end user feels the collision from the real object interaction as the real manipulator 100a is blocked at contact point 120a in the real environment, which results in a non-realistic mixed reality experience.

To overcome this limitation, recent work has proposed space warping techniques wherein the virtual space is distorted such that a variety of virtual environments can be mapped onto one single physical environment by allowing some discrepancy in the mapping between the virtual and the physical objects. To this end, the virtual space is warped, resulting in a discrepancy between the motion of the user-guided instrument in the real and in the virtual world, which may not be noticed by the end user as long as it is under his/her perceptual threshold. As will be recognized by those skilled in the art, warping may be accomplished by representing a 3D model by its surfaces, for instance a polygonal surface representation, manipulating the representation, and converting back the manipulated representation into a modified 3D model, but other warping techniques are also possible. FIG. 2 illustrates such an example where a user-guided instrument 100a moves with constant velocity on a flat plane 110a in the real environment A, and the flat plane is warped into a curved surface 110b in the virtual environment B. In turn, the velocity of the corresponding user-guided instrument avatar 100b in the virtual environment is not constant in order to maintain a coherent sensation during the movement. In "Redirected touching: warping space to remap passive haptics", published in IEEE Symposium on 3D User Interfaces, pp. 129-130, 2010, Kohli proposed to enhance virtual reality training systems with space warping in order to increase the number of training scenarios over a given real environment. However, it is not adaptive, in particular when the virtual environment parameters change over time and/or space according to the mixed reality scenario to be simulated.

BRIEF SUMMARY

Mixed reality simulation methods and systems described herein may efficiently and automatically adapt to a simulation scenario in a virtual environment on the one hand and tracking of the underlying physical environment on the other hand, while providing realistic passive haptic sensory feedback as consistent visual and tactile cues to the end user as he/she interacts with the physical components from the hardware simulator.

Note that while the embodiments described herein are used in passive haptic feedback scenarios, the systems and methods presented below may also be applied to active haptic feedback scenarios in some embodiments.

Embodiments described herein may relate to a mixed reality simulation method for rendering on a display a mixed reality scenario of a virtual environment adapted to a physical environment, the method comprising:

acquiring, with a sensor, a position of a physical environment object;

identifying a mismatch between a physical environment surface and a virtual environment surface, the mismatch depending on the physical environment object position and a mixed reality scenario parameter; and computing a mapping displacement for a virtual environment surface based on the identified mismatch.

Embodiments described herein may also relate to a mixed reality simulator system for rendering on a display a mixed reality scenario of a virtual environment adapted to a physical environment, the system comprising:

a physical object;

a sensor configured to acquire a position of the physical object;

a display;

a memory configured to store a virtual environment; and a processor circuit configured to:

receive the position of the physical object from the sensor;

identify a mismatch between a virtual environment surface and a physical environment surface, the mismatch depending on the physical object position and a mixed reality scenario parameter; and compute a mapping displacement for a virtual environment surface based on the identified mismatch.

A mismatch between the physical and the virtual environments is determined when at least one parameter of the virtual environment does not match a corresponding parameter of the physical environment. Concrete examples of parameters which may cause a visual and tactile mismatch include object surfaces or volumes, but other features may also cause a mismatch, for instance object textures.

A mixed reality simulation method for tracking the interaction of at least one physical manipulator with at least one physical object in the physical environment and rendering a virtual environment including at least one virtual manipulator may be provided. The virtual environment may diverge from the physical environment and/or the virtual manipulator may diverge from the physical manipulator in such a way that the visual and the tactile perception by the end user remain consistent.

In some embodiments, a simulation method may include identifying at least one mismatch between the virtual environment and the physical environment surfaces, computing mapping displacements for at least one virtual environment surface based on the differences between the original and the warped surface geometries, extrapolating the mapping displacement for the manipulator avatar in the virtual environment, adding the extrapolated mapping displacement for the manipulator avatar to at least one discrepant contact interaction point of the original avatar surface in order to model the distorted avatar surface, and rendering the distorted manipulator avatar and the statically space warped virtual environment objects to the end user onto the simulator display.

The mapping from the original to the distorted virtual reality avatar may be achieved by adaptive space warping. The amount of distortion between the maximal distorted model and the physical replica model may be further controlled by additional parameters, such as, but not limited to, scalar or composite parameters.

The manipulator may be a tool or part of the user body. The interaction contact discrepant point on the manipulator avatar surface may be identified at run-time as a function of the manipulator interaction with the physical object in the real environment.

In some embodiments, the matching interaction points may be chosen among the closest real interaction contact points from the surrounding object surfaces according to the user interaction at run-time. In the case of a mixed reality scenario requiring the removal or addition of such a surrounding object surface, the matching real interaction points may be progressively chosen on the other surrounding surfaces, so as to provide a realistic rendering while maintaining passive haptic feedback from all the underlying physical object surfaces. In some embodiments, the mapping function may depend on per-point scalar parameters, the parameters being identified based on the manipulator interaction with the physical object as tracked in the physical environment. In some embodiments, the mapping function may depend on visual properties associated with the mixed reality scenario and/or the physical environment, such as the presence of hidden surfaces, narrow field of view, or perceptual tricks to draw the end user attention away from the tactile feedback.

A mixed reality simulator system may render a mixed reality scenario according to the proposed method, and the manipulator interaction with the physical object may be tracked by position and/or orientation sensors.

DETAILED DESCRIPTION

Mixed Reality Simulator

Figure 1:
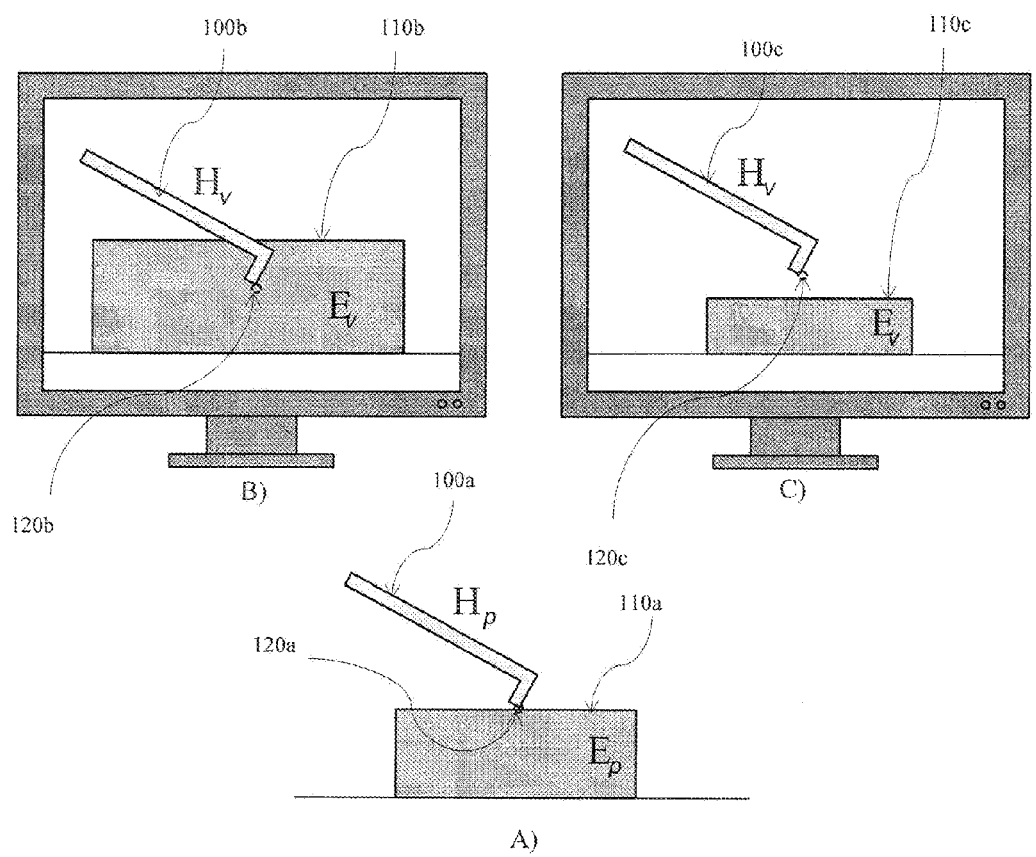
FIG. 1 shows possible contact interaction discrepancies between the user interaction in the real environment and in different virtual environment scenarios according to the prior art.
Figure 2:
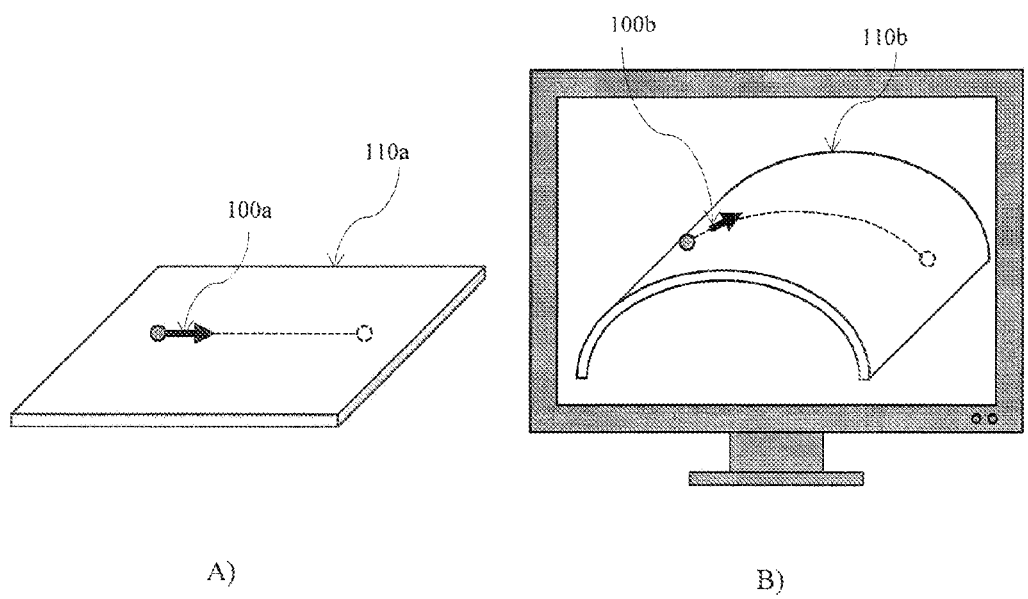
FIG. 2 shows an example of space warping according to the prior art.
Figure 3:
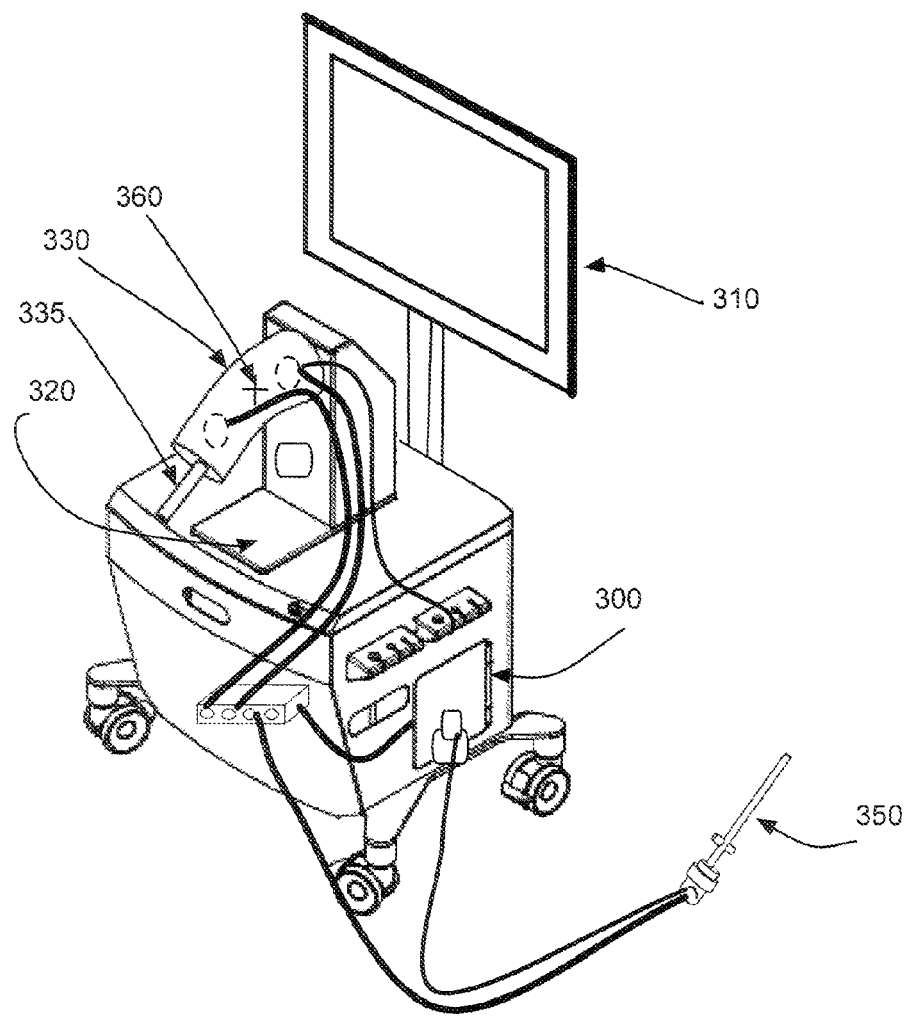
FIG. 3 shows a mixed reality simulator in the surgical training application field according to an embodiment of the invention.

In FIG. 3, an example mixed reality simulator cart for medical procedure training is shown. The exemplary mixed reality simulator embodiment may comprise a data processing unit 300 (i.e., a processor circuit or other suitable unit), a screen 310, and a plug 320 adapted to receive a real world model 330. Note that in some embodiments, the data processing unit 300 may comprise a plurality of processor circuits or other units, including remotely located units. As illustrated in this example, the real world model 330 may be a human anatomy mockup/model of a knee joint, but other models can be used. The mixed reality simulator is also applicable in fields other than medical procedure training, for instance planning, education, visualization, assessment, entertainment, etc. Furthermore, the simulation systems and methods described herein may be applied to other contexts and are not limited to simulator cart embodiments.

The mixed reality simulator screen 310 may be any device or system providing visual cues to the simulator end user, such as for instance, but not limited to, a conventional display screen, a laptop screen, a tactile screen, a tablet, a TV, a microscope, a head-mounted display, a projection screen, an Augmented Reality (AR) display, or any combination thereof.

The model 330 may be an integral part of the cart, or may be fastened to the cart in various ways. In a possible embodiment, it may be fastened in such a way that it may be easily plugged in and out, for instance by clipping it onto the cart, while reproducing a real organ position in an operating room. In the arthroscopy application field, in addition to the knee, other joint models may be used and interchanged with the human anatomy model 330 such as a shoulder model, a hip model, a wrist model, or an elbow model. Furthermore, in order to support other medical procedures than arthroscopy, other organ models may be interchanged with the anatomy model 330 such as a bladder, an upper torso, a lower torso, or a pelvic model. Other examples of anatomic models can be found in the catalogues of specialized anatomic model suppliers such as Limbs&Things, Bristol, UK. Some models may be plugged horizontally directly to the cart plug 320, for instance a lower torso or pelvic model. Other models may be fastened to a vertical mount that may be plugged to the cart plug 320. The knee model of FIG. 3 may be made of a flexible material such as plastic, so it may be manipulated by means of the model handle 335 to reproduce model motion and deformation, such as leg flexion and various valgus-varus angles in the example of the knee model.

The data processing unit 300 may comprise at least one central processing unit ("CPU") circuit, at least one memory, controlling modules, and communication modules to compute and display onto display screen 310 the actual mixed reality simulated views that correspond to the chosen mixed reality simulation scenario. As known to those skilled in the art, a number of solutions are available to align the virtual model with the anatomy model. In a possible embodiment, tracking of the real world model position and orientation may be applied, but other alignment methods are possible as well. The tracking may for instance be done according to the method and system described in U.S. Patent Publication US 2013-0189663 entitled "Medical Training Systems and Methods", the entirety of which is incorporated by reference herein, but tracking is not limited to this approach.

When tracking is applied, various sensor technologies may be used, such as a magnetic 6DOF tracking sensors as supplied for instance by the Ascension or Polhemus manufacturer, or optical tracking sensors. While in the general medical procedure case, sensors measuring all six degrees of position and orientation freedom may be used, in certain specific cases it may be possible to use simpler sensors measuring less than six degrees of freedom. For example, in the case where the real world model is constrained in a certain position and/or orientation it may be possible to measure a single degree of freedom such as a rotation angle. In the remainder of this application, the terminology "position", "position measurement", "position tracking" will be used regardless of the actual degrees of freedom in terms of either position or orientation, which is application dependent.

A model may include one or more sensors. In accordance with an example embodiment, a sensor may track each rigid part of the physical environment model which moves relatively to another rigid part in that particular model, for instance the femur and tibia bones in the knee arthroscopy case. In contrast, the tissues and the parts of the organs that are subject to different pathology case modeling, such as the ligaments and meniscus, may be simulated by various different virtual models corresponding to different types of patients, for instance an adult or a child, and/or different pathology training cases. In addition, the position and orientation of the rigid and non-rigid structures without sensors may also be interpolated based on information from other known structures, therefore in practice the choice and placement of sensors may be carried out according to accuracy and cost requirements of the given application.

FIG. 3 further shows a tool 350 that may be appended to the mixed reality simulator, so that the user can train in manipulating it. In many medical procedure simulations, at least one imaging tool is needed, for instance for diagnosis performed by exploring the organ. Examples of imaging tools are endoscopes that are inserted directly into the organ by a natural orifice or through a small incision, or imaging probes such as ultrasound probes that can also be used externally. For the purpose of illustration, in the case of a knee joint arthroscopy simulation, the medical tool 350 of FIG. 3 represents an arthroscope that can be inserted into the joint anatomy model 330 through a portal 360 chosen among known medical portals such as, in the case of the knee, the antero-medial portal, the antero-lateral portal, the dorso-medial portal, the dorso-lateral portal, the supramedial portal, or the dorso-supralateral portal. In an example embodiment, the imaging tool 350 may be a standard operation room tool suitable for various medical procedures, for instance an arthroscope indifferently suitable for knee, shoulder, or elbow endoscopy, that is adapted to comprise at least a position tracking sensor. Depending on the anatomic model used, the portals might be already incorporated in the models or might be created by the operator at any convenient position.

The data processing unit 300 may calculate the virtual model position and orientation in accordance with the model sensor measurement and the tool sensor measurement and display the virtual model position and orientation onto display screen 310. Physical parts of the real world model that can be moved independently along at least one degree of freedom may require accurate tracking to determine real world collisions of the physical tool with the physical environment model during the training manipulation, according to the various possible virtual models corresponding to mixed reality scenarios, for instance different patients, different organs and different pathologies in the medical training application. Thus, a sensor may be integrated into each such part. The relative position and orientation of the sensors with regards to the physical model parts may require accurate measurement. Various solutions are available to this end, such as, but not limited to, pre-calibrating each sensor as disclosed in the method and system described in U.S. Patent Publication US 2013-0189663 entitled "Medical Training Systems and Methods".

For the sake of illustration in the case of an arthroscopy simulator, a standard arthroscope tool 350 for knee arthroscopy is shown on FIG. 3. A high fidelity virtual environment including the bones, menisici, and ligaments may be simulated by the data processing unit 300. Other than and/or in addition to the arthroscope, different tools (not illustrated) may be appended to the mixed reality simulator, depending on the application. The tools may include, for example, a hook to push and pull tissue, a shaver, a grasp handle, a palpation hook, various types of punches (straight, slightly bent up, bent up, bent left, bent right, and/or 90°), a grasp, a shaver hand-piece with flow control, and/or a foot pedal entity. The end user may also directly interact with the model using his/her hands. In the remainder of this application, the wording "manipulator" will be used indifferently to represent any kind of tool or part of the user body which is used in the interaction with the physical environment, resulting in haptic tactile and kinesthetic cues to the end user. In the general case, the manipulator position may be tracked by means of a sensor, and the manipulator may comprise at least one rigid part that can touch the physical model by at least one contact point, such as the tip of the tool.

Both the virtual knee joint and the virtual manipulator may be arranged in a rendering of the virtual environment according to the tracked position and configuration of their counterparts in the physical environment. For instance, the endoscopic view of the virtual arthroscope may be synthesized by the data processing unit 300 and rendered on the display screen 310.

Efficient Mixed Reality Mapping by Space Warping

A method to map a diversity of non-conforming virtual and physical environments according to an embodiment of the invention will now be described in more detail. Employing passive haptics in a virtual environment (VE) denotes that the touching event in the virtual world is simultaneously accompanied by a tactile sensation. The user may interact with the VE through any kind of manipulator, which may be represented by an avatar in the VE. The manipulator can be a body part of the user, such as his/her finger or his/her entire body, but may also be any kind of user-guided tool, for instance endoscopic surgery tools. The virtual manipulator avatar and its physical environment tool counterpart may have a one-to-one matching or a differing geometry. More generally, the virtual environment objects and their physical environment counterparts, such as bones in the knee arthroscopy example, may have a one-to-one matching geometry or a different geometry. In the remainder of this application, the terminology "geometry, "shape", "wall", "surface" or "volume" will be used indifferently regardless of the actual underlying geometrical space dimension. Significant mismatches between the physical and virtual environment geometries may be present. For example, it may also occur that one object in the physical environment has no counterpart in the virtual environment (for instance a cut meniscus) or conversely, that one object in the virtual environment has no counterpart in the physical environment (for instance a calcification pathology).

For compelling passive haptics, the touching events in the virtual environment and in the physical environment may occur more concurrently. That is, when the physical manipulator touches a wall of the physical environment, the manipulator avatar may be visually in contact with the corresponding wall of the VE. While this may be trivially ensured for conforming virtual and physical environments, space distortion may be used if non-conforming virtual and physical components are considered. To accomplish this, a mapping function F which provides the mapping of the surface (for instance, the walls) of the VE from the shape S that corresponds to the physical objects to a desired shape S', corresponding to the representation of the original surface in the VE, may be defined. The required shapes can stem from different sources, for instance medical scans, manual modeling, or computations, and may be modeled in different ways, for instance by, but not limited to, polygon meshes. Based on this, the original surface warp displacement in a point x on the original shape S may be defined as:

$$\Delta x = F(x) - x$$

which represents the difference between the original and the distorted VE.

Figure 4:
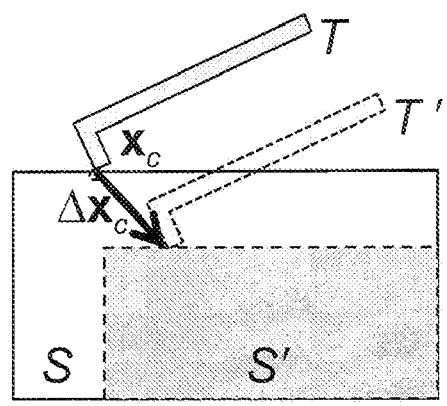
FIG. 4 shows an extrapolated mapping displacement of a manipulator avatar at contact point $X_c$ according to an embodiment of the invention.

In an example embodiment, as illustrated in FIG. 4, in order to ensure that a touch event occurs simultaneously in the physical environment and in the distorted VE, the manipulator avatar may be constrained to touch a distorted VE surface if and only if the user touches a physical environment surface with the real manipulator. Let $x_c$ be the contact point at which the avatar surface T touches the original surface S. For a rigid avatar, which may be the case for many tools, a rigid displacement of the VE may be computed as:

$$\Delta x_c = F(x_c) - x_c$$

In order to obtain a visually smooth movement of the manipulator avatar in the virtual environment, the free space around the manipulator in the virtual environment may be distorted as well. This distortion may be referred to as mapping displacements, or warping. To ensure a smooth behavior, in an example embodiment, a $C^1$-continuous function W may be approximated to compute for each point in space a mapping displacement based on minimum distances between the avatar surface T and the environment surface S. This space warping approximation may provide satisfactory results for a representative diversity of practical simulation scenarios while being efficient to compute in real-time, in particular when compared to the 3D thin plate formulation proposed by Kohli or when compared to solving a constrained variational minimization of the warp displacements after discretization of the continuous function in an Eulerian grid, as will be recognized by those skilled in the art.

In some embodiments, the environment surface may be clustered into N groups S[k], k=1 . . . N, for instance corresponding to the discretized surfaces of the bones, menisci, ligaments, and skin in the case of the virtual knee joint. For the sake of illustration, the environment surface of the tibial bone may be referred to as S[l], a subset of the overall surface S.

Figure 5:
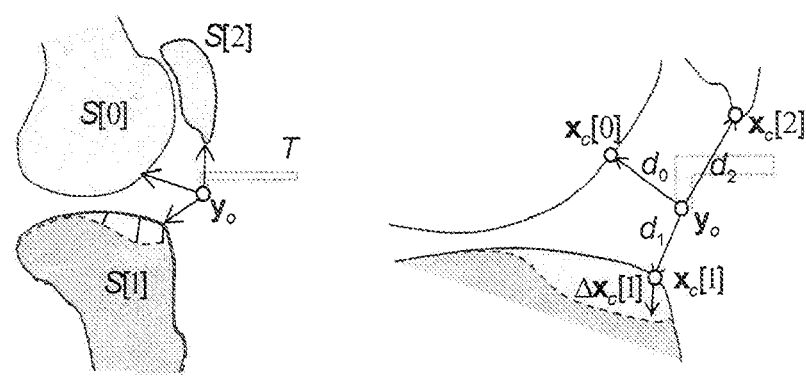
FIG. 5 shows a possible approximation of an extrapolated mapping displacement for a manipulator avatar as a weighted sum of three mapping displacements respectively referring to three different surrounding surfaces in the example of a virtual knee joint according to an embodiment of the invention.

In some embodiments, the contact point $x_c$ on the surface of the manipulator avatar may correspond to the main interaction point $y_o$ at the tip of the tool. To obtain the mapping displacement in free space, the minimum Euclidean distances $d_k(y_o, S[k])$ between $y_o$ and the N groups S[k], k=1 . . . N of the environment surface may be computed, along with the corresponding mapping displacement $\Delta x_c[k]$ of the closest point $x_c[k]$ in S[k], as illustrated in FIG. 5. The extrapolated mapping displacement W($y_o$) of the interaction point on the avatar may then be obtained by a weighted sum $$\Delta y_o = \frac{\sum_{k=1}^{N} \omega_k \Delta x_c[k]}{\sum_{k=1}^{N} \omega_k}$$

where the weights $$\omega_k = \exp\left(-\frac{d_k(y_o, S[k])^2}{2\sigma_0}\right)$$

may be obtained from a Gaussian kernel function, computed on the minimum Euclidean distances between $y_o$ and the environment groups $S[k]$, $\sigma_0$ indicating the width of the kernel. In some embodiments, $\sigma_0 = \min_k d_k(y_o, S[k])$, so that the smaller the distance between $y_o$ and one of the surface groups $S[k]$, the smaller the kernel width $\sigma_0$. Finally, the resulting extrapolated mapping displacement $\Delta y_o$ may then be added to all avatar points y in T, resulting in the space-warped avatar surface T'.

Adaptive Space Warping

An embodiment will now be described which may use a parametric space warping approach to simulate different mechanical behaviors in simulation scenarios requiring a significant geometrical difference between the physical environment and the virtual environment, for instance a significantly larger or smaller operating space in the virtual environment than the original physical object replica mechanically allows in the physical environment. By redefining the mapping function from the original geometry S to the distorted geometry S' to depend on a parametric scalar parameter s which controls the amount of warping, it may be possible to compute the extra distortion in an adaptive way.

In practice, the parametric warping scalar parameter may be defined according to the specific scenario application. In the knee joint case, for instance, when the anterior cruciate ligament (ACL) in the knee is torn, then the joint may become more flexible and may allow for a significantly larger valgus/varus opening than the replica itself supports. Unfortunately, the generic knee joint replica may not support this behavior, as a particular opening may require the same amount of force applied to the bone. However, one may efficiently simulate a torn ACL by adapting the space warping method. To this end, the distorted geometry S' may be obtained by applying a mapping function to the original geometry S, the mapping function being controlled by an additional scalar parameter s which may designate the amount of distortion, as x'=F(x;s) where s may be in the [0,1] range and x=F(x;0) when no distortion is applied.

In other applications, the parametric warping may be defined as a vector, a set of parameters, even possibly a set of time-varying parameters (examples: varying according to time of procedure, periodic variation such as in modeling a beating heart, etc.). The distortion may now be a function depending on some variable s, which may be referred to as adaptive distortion. In an example embodiment, a space warping method may be used to compute the adaptive distortion.

An exemplary embodiment of adaptive distortion by means of space warping in the case of knee arthroscopy simulation will now be further detailed. Consider the homogeneous transformation matrix T which may represent the position and orientation of the object component with limited maximal displacement, for instance the tibial bone in the knee simulator case, with respect to its initial configuration $T_0$[tibia]:

$$\binom{x}{1} = T\binom{x_0}{1} , x \in T[\text{tibia}], x_0 \in T_0[\text{tibia}]$$

Figure 6:
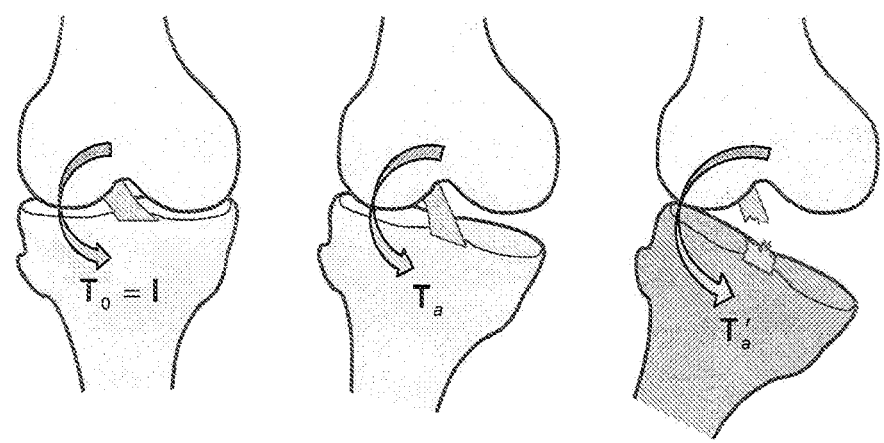
FIG. 6 shows a knee in its rest, pose, and target positions for a larger varus-valgus angle than a knee replica can achieve according to an embodiment of the invention.

With reference to FIG. 6, each value of T may correspond to a different pose, that is, a different joint opening in the torn ACL simulation scenario, from the rest pose $T_0$=I up to the key pose $T = T_a$ corresponding to the maximal pose extension on the physical object, for instance the maximal opening of the knee replica. To mimic a torn ACL, the virtual knee model may instead have an even larger opening angle, which may be target pose $T'_a$, corresponding to the maximal varus-opened pose. In practice, this pose may be obtained by removing the ligaments from the knee replica and recording the resulting varus-opened pose, but other approaches are also possible.

The matrix $$\Delta T_a = (T'_a)^{-1} T_a$$

may correspond to the difference between the key pose and the target pose.

We may now define $$\binom{\mathcal{F}(x; s)}{1} := interp(s, I, \Delta T_a)\binom{x}{1} , x \in T[\text{tibia}]$$

that is, the mapping may include interpolating between the unwarped current tibial bone geometry $T_0$[tibia], and a rigidly transformed tibial bone, where interp(.) may be an arbitrary, i.e. linear or non-linear, interpolation operator. In an example embodiment, the transformation may be decomposed into a translational part and a rotational part, and linear interpolation may be applied to the translational part of the transformation while spherical interpolation may be applied to the rotational part.

In some embodiments, the full warping may be applied only when the current pose of the physical object approaches the key pose $T_a$ corresponding to the maximal pose extension on the physical object. Thus, in an example embodiment, the scalar parameter s may be set to be proportional to the difference between the current pose T and the key pose $T_a$. Practical modeling of s may depend on the target application; for instance, in the specific case of the knee torn ACL simulation, due to the stiff rubber ligaments of the plastic knee model, the rotational part of T may dominate. Therefore, s may be set based on the angular difference:

$$\alpha = \angle(T, T_a) \in [-\pi, \pi]$$

and a Gauss kernel may be employed to obtain values between 0 and 1, as $$s = \exp\left(-\frac{\alpha^2}{2\sigma_\alpha^2}\right)$$

where $$\sigma_\alpha = \angle(I, T_a)$$

is the kernel width, depending on the angle between rest and key pose. This may result in the desired behavior; in particular, it may allow warping the virtual knee joint to the desired target pose in the VE, when the current physical pose approaches the key pose. Other embodiments are possible as well.

Note that in order to further improve the warping, it may be beneficial to use multiple pairs ($T_a$, $T'_a$), each corresponding to a different bending angle. For this one mapping function may be further defined as:

$$F_\tau(x;s_\tau) \text{per pair}(T_a,T'_a),(T_b,T'_b), \text{etc.}$$

where $s_\tau$ represents the influence of the pair ($T_\tau$, $T'_\tau$). During the simulation, the distance between the interaction point $y_o$ and the original tibial bone in the current pose $T_\tau$ may be computed and the mapping displacements that depend on the distance between T and each key pose may be assembled. In an example where the key pose corresponds to a 45° angle and the target pose is about 10° further, three pairs may be sufficient to plausibly model a torn ACL behavior. Thus, the method described herein may be efficient to implement while providing passive haptic feedback in a realistic way.

While in the above described embodiment, a scalar parameter has been described, it is also possible to generalize the proposed approach to the use of multiple and/or composite parameters.

Variable Mapping with User Interaction

An embodiment will now be described which may enable user-controlled changes in the scene. In some mixed reality scenarios, some parts of the virtual environment model may be interactively modified (added or removed). This may be a challenging task, which may be hardly possible in a simulator based on passive haptics without warping. For example, in the removal case, actual cutting of the physical object replica in particular may irreparably destroy the simulator hardware. But then, if the physical replicas are not modified, the user may experience a haptic discrepancy, since he/she feels a haptic cue of the original object, while the virtual object has been cut-off. A practical example in the knee simulator application is the removal of a damaged meniscus. A standard treatment to be simulated in a mixed reality scenario may include removing part of the meniscus locally around the damaged region with a cutting instrument.

In order to address this problem, temporal dependency may be added to the mapping function computation, starting from an undistorted object and progressively switching to further object distortion, depending on the location and amount of object removal in the virtual environment. During cutting, the topology of the object geometry may be altered, parts of the previous object surface may be removed, and a new object surface may be built along the intersection of the object surface and the blade tool surface. A cut function may be modeled as $$\text{cut}: S^{(I-1)} \to S^{(I)}$$

which, given the meniscus surface $S^{(I-1)}$ after I−1 cuts, may produce a new meniscus surface $S^{(I)}$, with $S^{(0)}=S$. Due to the original surface changing with the user interaction in the virtual environment, it may not be realistic to pre-compute or manually design the original surface warping function, so instead it may rather be determined automatically at run-time, based on the current cutting state. As known to those skilled in the art, a possible solution may include re-meshing the cut meniscus surface $S^{(I)}$ such that it matches again the topology of the original meniscus $S^{(0)}$, or conversely re-meshing the original meniscus geometry to match the current state. However, re-meshing may be an inherently difficult problem, and the corresponding computation methods may be too complex to implement and/or too computationally expensive at runtime. A geometric projection of the original surface onto the cut surfaces may not work either, since the identification of corresponding surface features may not be straightforward. Instead, the mapping function may be derived based on a prior-known target surface.

This will be better understood from the detailed description of an exemplary embodiment in the mixed reality scenario simulating the meniscus cut from the user interaction with a knee replica embedding a regular, full shape meniscus component.

Figure 7:
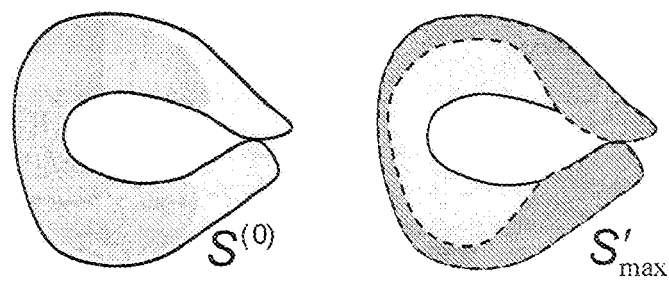
FIG. 7 shows a meniscus and a maximally warped meniscus to be simulated in a meniscus cut surgery scenario according to an embodiment of the invention.

In pre-computation, a warped meniscus $S'_{max}$ may be generated that may correspond to a maximally cut meniscus, as depicted in FIG. 7. This may be achieved by different techniques, for instance manually with sculpting software or automatically with a statistical shape model. Then, at simulation time, an interpolation between the original geometry S and the maximally warped geometry $S'_{max}$ may be computed such that the current cut meniscus geometry $S^{(I)}$ may be approximated. This may be accomplished by considering both the amount of removed material and the location of the cut.

For example, let V(S) be a real number measuring the volume enclosed by the surface S. For triangulated manifolds, this function may be evaluated efficiently. Then, $V^{(I)}$ may be the enclosed volume of the current meniscus surface after the I-th cut. Further, by comparing the topologies of $S^{(I)}$ and $S^{(I-1)}$, the geometry of the newly created cut surface may be obtained, yielding information on the location $x^{(I)}_{cut}$ and geometric extent $h^{(I)}$ of the region of excised material.

Figure 8:
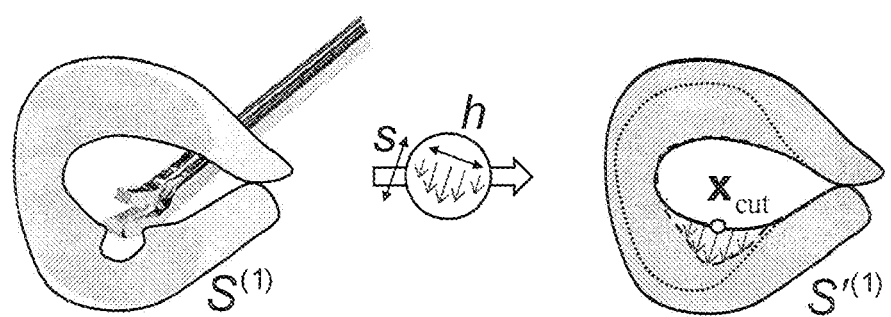
FIG. 8 shows a mapping displacement extrapolation as applied by a mixed reality simulation method in the case of a cut surgery scenario according to an embodiment of the invention.

In an example embodiment, the meniscus in the VE may be modified by employing a punch-like cutting tool with a volumetric blade geometry, as illustrated in FIG. 8. The displacements may be folded with a Gaussian kernel in order to mimic an effect similar to brush-sculpting, as known to those skilled in the art. A modification process approximating the geometry of the blade may be applied around the location $x^{(I)}_{cut}$ with a geometric extent of $h^{(I)}$ of the region of excised material. Further, the magnitude of the effect on the surface points may be adjusted by introducing a control parameter in the form of a scalar s applicable at location $x^{(I)}_{cut}$ for a geometric extent of $h^{(I)}$. In an example embodiment, a Gaussian kernel may be used to smooth out the determined mapping displacements towards the borders of the approximated brush tool.

The resulting adaptive mapping function may be modeled as a function of the original surface S and a vector s of m point-wise scalars, where m is the number of surface points of the discretized meniscus geometry:

$$F(x;s) := (I-\text{diag}(s))x + \text{diag}(s)x'_{max}, \text{ where } x \text{ belongs to } S, x'_{max} \text{ to } S'_{max}.$$

To ensure that the difference between the two warped geometries corresponds to the amount of removed material, the above adaptive mapping function may be computed iteratively in a binary search for the vector $s=(s_1, \ldots, s_m)$ until the volume of the warped surface matches the current volume of the cut meniscus surface, as described by the following example algorithm:

---
Algorithm 1 brushWarp( ) // function called after each cut I

---

// initialize variables for the binary search
s=1/2 // start with 50% warp
k=1/4
// perform binary search for the variable s ('magnitude' of brush)
repeat
    $s^{(I)} = s^{(I-1)} + \text{gaussianBrush}(x^{(I)}_{cut}, h, s)$
    $S'^{(I)} = F(x; s^{(I)})$ //compute the distorted geometry $S'^{(I)}$

```
Algorithm 1 brushWarp( ) // function called after each cut I

//adjust s in order to approach the target volume V^(J)
    if V(S^(J)) > V^(J) then
        s=s+k
    else
        s=s-k
    endif
    k=k/2 // adjust k to refine the binary step
until | V(S^(J)) - V^(J) | < ε
```

In an example meniscus cut scenario with a conventional surgery blade tool, five or fewer iterations may be sufficient to converge, so the method may be efficient enough to be applied to run-time user interaction modeling. The resulting warped geometry approximation of the current cut meniscus geometry may be sufficiently accurate to provide realistic visualization to the user, in accordance with the passive haptic tactile cues. In addition, the described approach may be very robust, since the approach may only rely on per-point scalars $s_i$ in the [0,1] range instead of displacements. Consequently, the warping may be unable to diverge, even if violent, unpredicted user interactions occur. While the method has been described for volumetric blade geometries that cut non-progressively, it can also be extended to knife-like blades.

Furthermore, while the above-described example has been detailed for the specific implementation of the meniscus cut mixed reality scenario, it can be generalized to other mixed reality scenarios in which virtual environment object components are to be interactively removed or added at run-time, as will be recognized by those skilled in the art.

The systems and methods described herein may also be generalized to further mixed reality scenarios in which the physical environment object components themselves are interactively removed or added at run-time either manually by the end user or automatically by an additional mechanism, in association with the mixed reality scenario. Indeed, as they are both spatially and temporally adaptive, the systems and methods described herein can encompass a diversity of physical and virtual environments non-conformance configurations, including in complex real-time interaction scenarios.

Combined Mixed Reality Mapping Method

A general mixed reality simulation method will now be described in more detail. In practical mixed reality scenarios, several of the paradigms addressed so far may be combined. In general, various virtual environment parameters that may cause a mismatch between the virtual environment and the physical environment may be considered. For instance a mixed reality scenario for a knee arthroscopy training simulator may represent a torn ACL in combination with a differing bone geometry from the knee replica model.

It may be possible to combine static space warping with adaptive space warping as the warp displacements may be added serially. A warp displacement may be computed based on the distance between the current and the key pose of the knee joint; then, a second warp displacement may be computed based on the distance between the unwarped manipulator avatar and the original tibia shape, and the mapping from the original tibia shape to its distorted counterpart. The first and the second warp displacement may then be added, where the first adaptive warp displacement may be scaled by the parameter s. The resulting distorted tibia shape may then be obtained by transforming the statically warped tibia shape by the adaptive space warping interpolation function, instead of the original tibia shape.

The combination of the temporal space warp with the static approach may require applying proper steps in the right order, for instance when the former is interpolated between the original and a maximally warped shape. To this end, the static space warping function which maps the original to its distorted shape may be computed first. By translating the avatar by this displacement, the warped avatar and the statically warped object may be obtained. The cutting may then be performed based on the warped geometries. Instead of applying the brush from the original surface, as formerly described, the brush may be applied to the formerly computed statically warped surface. The resulting map may be obtained as the combination between the static space warping function F, transforming S into S' in the first place and the further temporal space warping function G interpolating between the uncut but statically warped object S' computed in the first place and the maximally cut warped object $S'_{max}$ according to the tracked user interaction, modeled by per-point scalar parameters, resulting in the correctly warped shape S" to be finally rendered to the end user.

Mixed Reality Warping Method with Perceptual Illusion

The temporal space warping method may also be adapted to some characteristics of the user interaction and/or mixed reality scenario which further facilitate a perceptual illusion, in particular in any transitory states where the space warping cannot be rendered smoothly, resulting in a mismatch between the visual displacement of the avatar and the displacement of the physical manipulator by the end user beyond perception mismatch threshold. For instance, it may happen that the space warping extrapolation is discontinuous, so the end user experiences a "jump" from one surface to another in a particular transition. Depending on the mixed reality scenario, it may be possible to hide these transitions by space warping in a hidden area in the virtual environment display. For instance in the endoscopy scenario it may be possible to hide the transition out of the arthroscope narrow field of view. It may also be possible to render a bleeding area to hide the transition behind the cloud of blood. It may also be possible to introduce additional visual cues to draw away the attention of the end user, such as a change in color or texture, filaments, a training score update or "be careful" alert update on the screen, possibly blinking, or a sound, etc. It may also be possible to introduce an artificial delay in the rendering by predicting the availability of a more realistic hiding opportunity and delaying the display accordingly. Various other embodiments are possible, depending on the actual features of the mixed reality scenario and user interaction to be realistically rendered.

Exemplary Method 1

Figure 9:
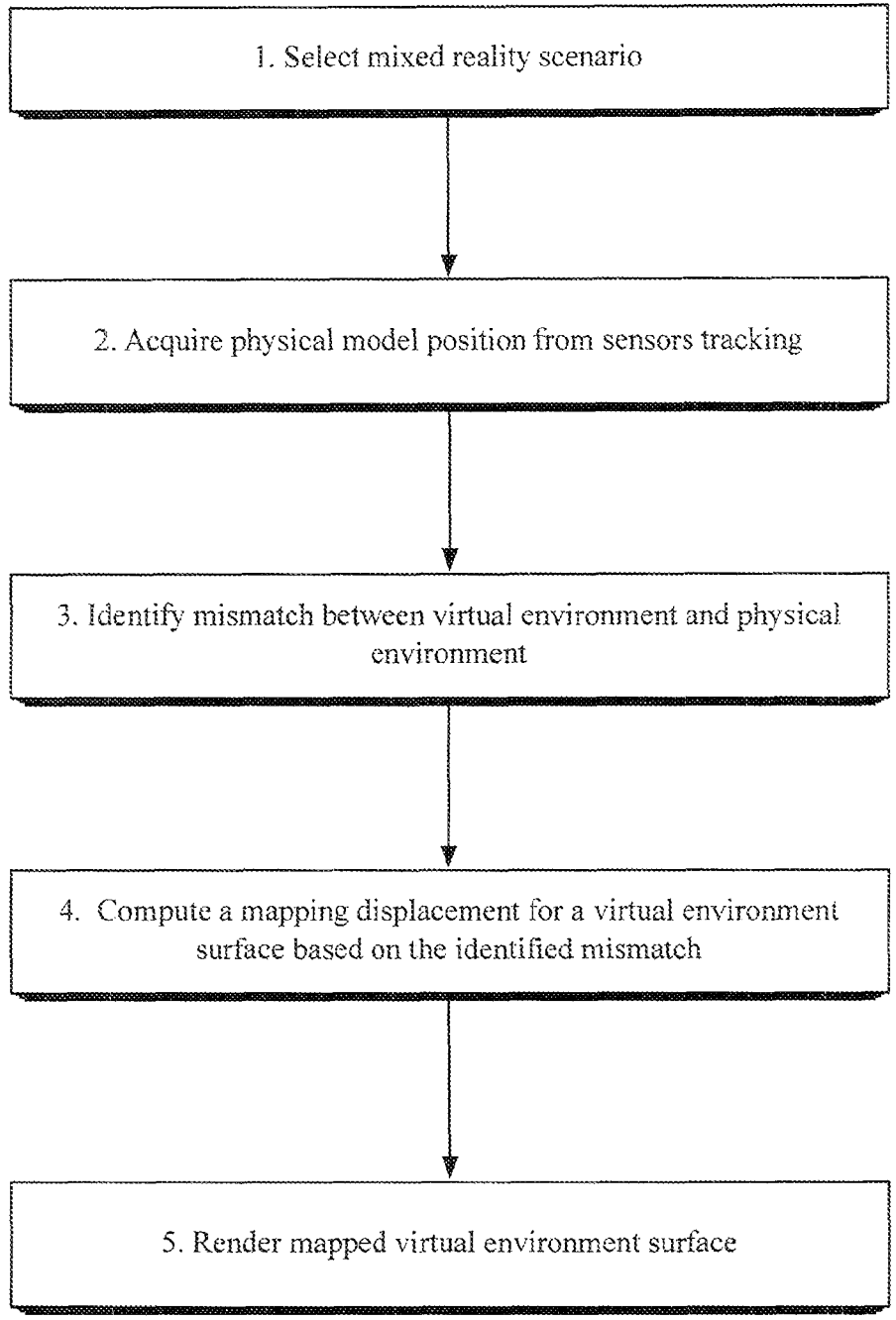
FIG. 9 shows a flow chart of a mixed reality method according to an embodiment of the invention.

A possible embodiment of the proposed method will now be described as detailed in FIG. 9, with reference to the mixed reality simulator system components as depicted in FIG. 3.

In 1, the data processing unit 300 may select and display on the display screen 310 a choice of mixed reality simulation scenarios matching the mounted physical model replica and tools. In some embodiments a touch screen may be used for user selection input. Other embodiments are also possible, for instance the mixed reality scenario may be selected remotely by the training room operator.

In 2, the data processing unit 300 may acquire the physical model position from tracking sensors in the physical environment. The data processing unit 300 may then be ready to compute and render the actual VR simulation images by tracking the physical environment position at run-time.

In 3, the data processing unit 300 may identify at least one mismatch between the virtual environment and the physical environment surfaces, depending on a mixed reality scenario parameter, for instance, but not limited to, a spatially and/or a temporally varying parameter and/or a user interaction parameter.

In 4, the data processing unit 300 may compute the mapping displacements for at least one virtual environment surface based on the identified mismatch.

In 5, the data processing unit 300 may render at least one mapped virtual environment surface to the end user onto the simulator display 310. Alternate embodiments are also possible, for instance the simulator data processing unit may store the mapped virtual environment data for later processing or rendering or communicate the result to a distant unit for remote processing or rendering.

Depending on the actual mixed reality scenario, further intermediate actions may be performed. In a mixed reality scenario where the mapped virtual environment geometry may go beyond what can be supported by the original physical environment geometry, adaptive space warping may be applied by adding a scalar or composite parameter to control the amount of warping in the warping computation steps.

In a mixed reality scenario where the mapped virtual environment geometry may go beyond what can be supported by the original geometry, a combination of adaptive space warping and perceptual tricks may be applied in order to constrain the rendering under the perceptual mismatch threshold of the end user.

In a mixed reality scenario where parts of the original geometry may be removed or added in the mapped VE geometry, according to tracked manipulator interaction, temporal space warping may be further computed by applying spatially variable scalar or composite parameterization to the space warped surfaces out of the static or adaptive warping computation preliminary steps. In one possible embodiment, per-point scalar parameterization may be applied, but other methods are also possible.

Similarly, in a mixed reality scenario where parts of the original geometry may be removed or added in the physical environment at run-time according to an automation mechanism or a manual user interaction, temporal space warping may be further computed by applying spatially variable scalar adaptive mapping to the space warped surfaces out of the static or adaptive warping computation preliminary steps.

Exemplary Method 2

Figure 10:
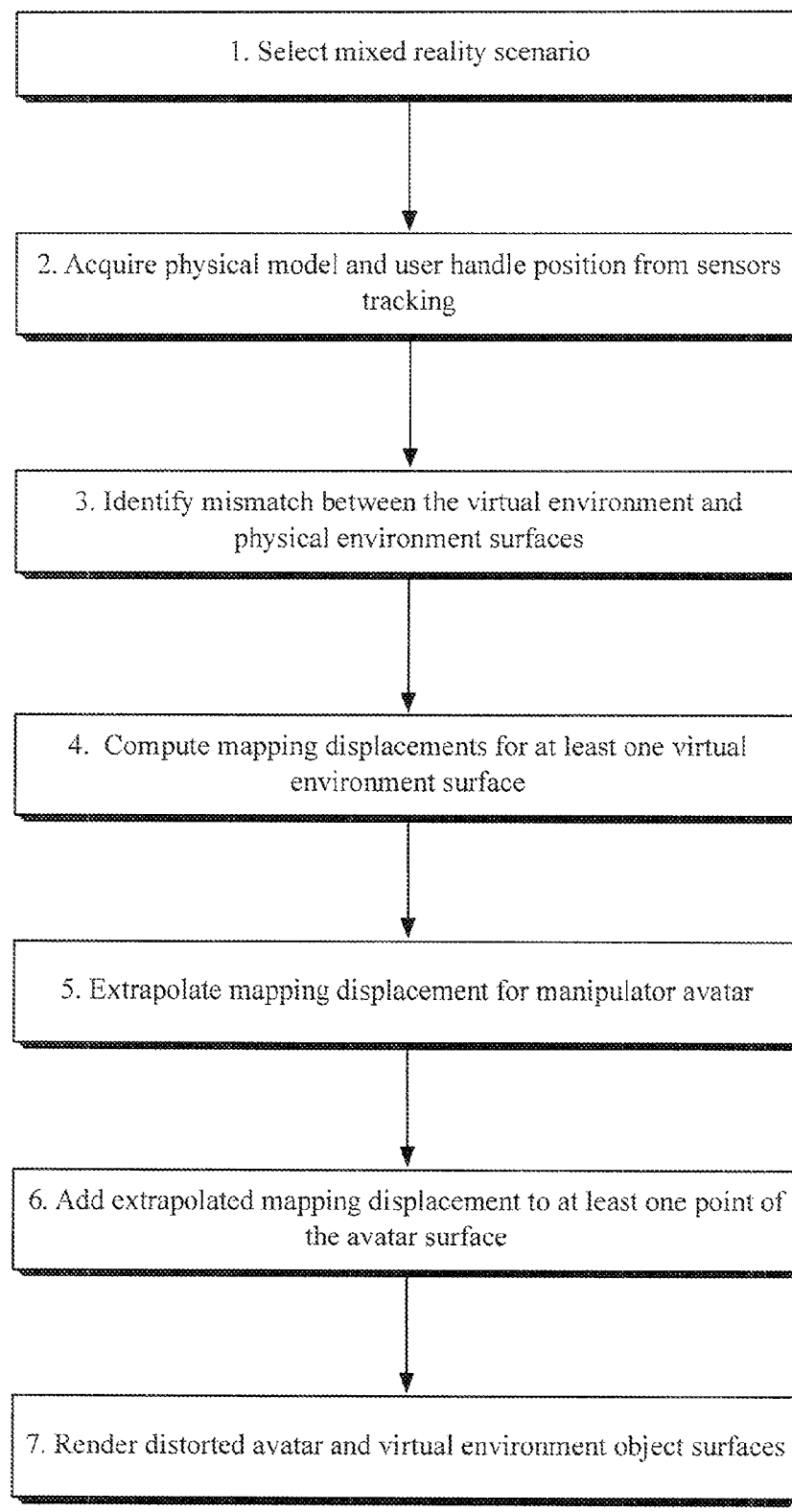
FIG. 10 shows a flow chart of a mixed reality method according to another embodiment of the invention.

Another possible embodiment of the proposed method will now be described as detailed in FIG. 10, with reference to the mixed reality simulator system components as depicted in FIG. 3.

In 1, the data processing unit 300 may select and display on the display screen 310 a choice of mixed reality simulation scenarios matching the mounted physical model replica and tools. In some embodiments a touch screen may be used for user selection input. Other embodiments are also possible, for instance the mixed reality scenario may be selected remotely by the training room operator.

In 2, the data processing unit 300 may acquire the physical model and manipulator position from their respective tracking sensors in the physical environment. The data processing unit 300 may then be ready to compute and render the actual VR simulation images by tracking the user interaction at run-time. In some embodiments the manipulator may be a rigid tool instrument, but other embodiments are also possible, for instance part of the user body may be directly used and tracked such as a user's finger.

In 3, the data processing unit 300 may identify at least one mismatch between the virtual environment and the physical environment surfaces, according to the mixed reality scenario to be rendered and the current state of the tracked physical environment.

In 4, the data processing unit 300 may compute the mapping displacements for at least one virtual environment surface based on the difference between the original and the warped surface geometries.

In 5, the data processing unit 300 may extrapolate the resulting mapping displacements to distort the free space between the virtual environment surfaces in order to obtain the mapping displacement for the avatar manipulator in this free space. In some embodiments, a variant of linear extrapolation may be used, but other methods are also possible.

In 6, the data processing unit 300 may add the mapping displacement to at least one discrepant contact interaction point of the original avatar surface in order to model the distorted avatar surface. In a possible embodiment, the discrepant interaction contact point may be at the tip of the manipulator tool, but other positions are also possible, depending on the actual object surfaces and virtual environment model in the mixed reality scenario. In one embodiment, the data processing unit 300 may determine the minimum distances between the discrepant interaction contact point $y_o$ on the original surface of the manipulator avatar and the original object geometries; both the warped and unwarped parts of the mixed reality physical object may be considered in this mapping in order to ensure that no warping is done when the avatar touches an unwarped structure.

In 7, the data processing unit 300 may render the distorted manipulator avatar and the statically space warped virtual environment objects to the end user onto the simulator display 310. Alternate embodiments are also possible, for instance the simulator data processing unit may store the distorted avatar data for later processing or rendering or communicate the result to a distant unit for remote processing or rendering. Also, in this example the avatar is distorted by being bent, but in other embodiments and/or scenarios, the avatar may be mapped into the simulator display 310 in its original shape. For example, the avatar may be resized, but otherwise unchanged, and rendered. Thus, "distorted" as used herein is not limited to bending.

Depending on the actual mixed reality scenario, further intermediate actions may be performed. In a mixed reality scenario where the VE warped geometry may go beyond what can be supported by the original geometry, adaptive space warping may be applied by adding a scalar or composite parameter to control the amount of warping in the warping computation steps.

In a mixed reality scenario where the VE warped geometry may go beyond what can be supported by the original geometry, a combination of adaptive space warping and perceptual tricks may be applied in order to constrain the rendering under the perceptual mismatch threshold of the end user.

In a mixed reality scenario where parts of the original geometry may be removed or added in the VE warped geometry, according to tracked manipulator interaction, temporal space warping may be further computed by applying spatially variable scalar or composite parameterization to the space warped surfaces out of the static or adaptive warping computation preliminary steps. In one possible embodiment, per-point scalar parameterization may be applied, but other methods are also possible.

Similarly, in a mixed reality scenario where parts of the original geometry may be removed or added in the physical environment at run-time according to an automation mechanism or a manual user interaction, temporal space warping may be further computed by applying spatially variable scalar adaptive mapping to the space warped surfaces out of the static or adaptive warping computation preliminary steps.

Additional Embodiments

In additional embodiments, beyond live rendering of the mixed reality simulation scenario, the data processing unit 300 may apply various additional processing, such as, but not limited to, recording and playing back the simulation, evaluating and ranking the trainee performance and progress, compiling training statistics, raising alarms, and highlighting certain scenarios or scenes to draw special attention from the end user.

Other advanced applications of the proposed mixed reality simulator may involve the insertion of an external device into the anatomy model. Examples of such an application may include the simulation of the insertion of an intrauterine device ("IUD") into the womb through the cervix, or the simulation of the insertion of a coronary stent under fluoroscopy guidance. In an example embodiment the external device may be virtually simulated. In another example embodiment, a real external device may be used. In the latter case a position sensor may be mounted to the external device in order to accurately track it and model the related user interaction similarly to that of a manipulator tool according to the proposed methods disclosed herein.

While the proposed method may be particularly suitable to provide primarily passive haptic feedback, it may also be combined with active haptic solutions such as force feedback actuators, as known by those skilled in the art. Such active haptic solutions may provide at least part of the simulator functionality. They may be placed along one or more mechanical axes and/or degrees of freedom of the simulator hardware configuration.

Applications

The proposed mixed reality simulation method and system may present substantial advantages, as multiple mixed reality scenarios can be simulated using the same multi-purpose simulator, while providing realistic passive haptic feedback, even in simulation scenarios with significant discrepancies such as a larger mechanical range of interaction or the removal or addition of some underlying object parts in the virtual reality environment or the physical environment.

In particular, the proposed simulation method may be efficient enough to be applied to the case of mixed reality scenarios in which the virtual environment is scaled beyond the underlying physical object geometry. It may also be well suited to temporally varying mixed reality scenarios, where the physical object geometry changes within the scenario, as is for instance the case in medical procedure training mixed reality scenarios with organ replicas.

Other Applications

Although the detailed description above contains many specificities, these should not be construed as limiting the scope of the embodiments but as merely providing illustrations of some of several embodiments. For instance, different physical objects and manipulators may be used. Other applications of the proposed mixed reality simulator are also possible beyond the medical application field. For flight and driving training, a mixed reality simulator according to the proposed method and system can be used with the appropriate visualization setup, as will be recognized by those skilled in the art, to provide passive feedback on different kinds of terrain from a steering wheel, gear, cockpit or dashboard simulation handles and buttons mounted on the simulator; the corresponding avatars may slightly differ from one mixed reality scenario to another without the user noticing the difference, providing a realistic immersion to the end user from a general purpose simulator instead of multiple specialized simulators with active haptic feedback as in the state of the art, which clearly results in significant installation and maintenance cost savings for the simulator operation. Gaming applications, in particular the field of serious gaming rehabilitation simulators as well as general virtual reality applications such as exploratory systems (keyword redirected walking, etc.) will also benefit from the proposed more efficient and cost effective passive feedback simulator.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A mixed reality simulation method for rendering on a display a mixed reality scenario of a virtual environment adapted to a physical environment, the method comprising:
   acquiring, with at least one sensor, a position of a physical environment object;
   identifying, with at least one processor circuit in communication with the at least one sensor, a geometric mismatch between a physical environment surface and a virtual environment surface, the geometric mismatch depending on the physical environment object position and a mixed reality scenario parameter;
   computing, with the at least one processor circuit, based on the geometric mismatch, a mapping displacement for the virtual environment surface to distort the virtual environment surface; and
   rendering, with a display, the distorted virtual environment surface such that a visual perception and a tactile perception by an end user are consistent while the geometric mismatch is preserved.

2. The method of claim 1, wherein the parameter is a scalar parameter.

3. The method of claim 1, wherein the parameter is a composite parameter.

4. The method of claim 1, wherein the parameter is a temporally-varying parameter.

5. The method of claim 1, wherein the parameter is a spatially-varying parameter.

6. The method of claim 1, wherein the parameter depends on the user interaction with at least one manipulator.

7. The method of claim 6, wherein the at least one manipulator is a tool.

8. The method of claim 6, wherein the at least one manipulator is part of a user body.

9. The method of claim 1, further comprising:
rendering, with the at least one processor circuit, a virtual environment surface based on the mapping displacement.

10. The method of claim 1, further comprising:
rendering, with the at least one processor circuit, a virtual environment surface based on the mapping displacement and a perceptual illusion.

11. The method of claim 1, wherein the mapping displacement is constrained to limit a perceived mismatch below a user perception threshold.

12. The method of claim 1, further comprising:
extrapolating, with the at least one processor circuit, a mapping displacement for a virtual environment surface based on the computed mapping displacement for the mismatching virtual environment surface.

13. The method of claim 12, wherein the virtual environment surface is a tool surface.

14. The method of claim 12, wherein the virtual environment surface is a user body surface.

15. The method of claim 12, further comprising:
rendering, with the at least one processor circuit, a warped virtual environment object based on the extrapolated mapping displacement for the virtual environment surface.

16. A mixed reality simulator system for rendering on a display a mixed reality scenario of a virtual environment adapted to a physical environment, the system comprising:
at least one processor circuit, the at least one processor circuit configured to:
receive a position of a physical environment object from at least one sensor;
identify a geometric mismatch between a physical environment surface and a virtual environment surface, the geometric mismatch depending on the physical object position and a mixed reality scenario parameter;
compute, based on the geometric mismatch, a mapping displacement for the virtual environment surface to distort the virtual environment surface; and
render, via a display, the distorted virtual environment surface such that a visual perception and a tactile perception by an end user are consistent while the geometric mismatch is preserved.

17. The system of claim 16, wherein the parameter is a scalar parameter.

18. The system of claim 16, wherein the parameter is a composite parameter.

19. The system of claim 16, wherein the parameter is a temporally-varying parameter.

20. The system of claim 16, wherein the parameter is a spatially-varying parameter.

21. The system of claim 16, wherein the parameter depends on the user interaction with a manipulator.

22. The system of claim 21, wherein the manipulator is a tool.

23. The system of claim 21, wherein the manipulator is part of a user body.

24. The system of claim 16, wherein the at least one processor circuit is further configured to render a virtual environment surface based on the mapping displacement.

25. The system of claim 16, wherein the at least one processor circuit is further configured to render a virtual environment surface based on the mapping displacement and a perceptual illusion.

26. The system of claim 16, wherein the mapping displacement is constrained to limit a perceived mismatch below a user perception threshold.

27. The system of claim 16, wherein the at least one processor circuit is further configured to extrapolate a mapping displacement for a virtual environment surface based on the computed mapping displacement for the mismatching virtual environment surface.

28. The system of claim 27, wherein the virtual environment surface is a tool surface.

29. The system of claim 27, wherein the virtual environment surface is a user body surface.

30. The system of claim 27, wherein the at least one processor circuit is further configured to render a warped virtual environment object based on the extrapolated mapping displacement for the virtual environment surface.

31. A mixed reality simulator system for rendering on a display a mixed reality scenario of a virtual environment adapted to a physical environment, the system comprising:
a physical object;
at least one sensor configured to acquire a position of the physical object;
at least one display;
at least one memory configured to store a virtual environment; and
at least one processor circuit in communication with the at least one sensor, the at least one display, and the at least one memory, the at least one processor circuit configured to:
receive the position of the physical object from the sensor;
identify a geometric mismatch between a virtual environment surface and a physical environment surface, the geometric mismatch depending on the physical object position and a mixed reality scenario parameter;
compute, based on the geometric mismatch, a mapping displacement for the virtual environment surface to distort the virtual environment surface; and
render, via a display, the distorted virtual environment surface such that a visual perception and a tactile perception by an end user are consistent while the geometric mismatch is preserved.

32. The system of claim 31, further comprising at least one manipulator, the parameter being dependent on the user interaction with the at least one manipulator.

33. The system of claim 32, wherein the at least one manipulator is a tool.

34. The system of claim 32, wherein the at least one manipulator is part of a user body.

35. The system of claim 31, wherein the at least one processor circuit is further configured to cause the display to display the computed virtual environment surface.

* * * * *